(12) United States Patent
Knutson

(10) Patent No.: US 6,572,505 B1
(45) Date of Patent: Jun. 3, 2003

(54) POWER TRANSMISSION BELT USING STABILIZED OPEN MESH TEXTILE MATERIAL IN OVERCORD FOR ENHANCED RUBBER PENETRATION

(75) Inventor: Paul S. Knutson, Aurora, CO (US)

(73) Assignee: The Gates Corporation, Denver, CO (US)

( * ) Notice: Subject to any disclaimer, the term of this patent is extended or adjusted under 35 U.S.C. 154(b) by 146 days.

(21) Appl. No.: 09/709,609

(22) Filed: Nov. 9, 2000

Related U.S. Application Data (60) Provisional application No. 60/165,381, filed on Nov. 12, 1999, provisional application No. 60/206,102, filed on May 20, 2000, and provisional application No. 60/240,587, filed on Oct. 13, 2000.

(51) Int. Cl.[7] .............................. F16G 1/04; F16G 5/08
(52) U.S. Cl. ....................................... 474/260; 474/263
(58) Field of Search .......................... 474/263, 265, 474/261, 267, 268, 270, 238, 262, 271, 250; 156/140, 244, 138, 137, 85; 198/847; 428/250, 253, 254, 373, 374

(56) References Cited

U.S. PATENT DOCUMENTS

| | | | |
|---|---|---|---|
| 2,167,384 A | * | 7/1939 | Freedlander ............... 474/261 |
| 2,800,701 A | * | 7/1957 | Watts et al. ............... 156/137 |
| 3,564,933 A | * | 2/1971 | Clinkenbeard ............. 474/262 |
| 3,724,284 A | * | 4/1973 | Eng et al. .................. 474/265 |
| 3,853,017 A | * | 12/1974 | White et al. ............... 474/238 |
| 3,981,206 A | | 9/1976 | Miranti, Jr. et al. |
| 4,490,925 A | | 1/1985 | Smith |
| 4,551,120 A | | 11/1985 | Thomey |
| 4,681,558 A | | 7/1987 | Rausch |
| 4,891,040 A | * | 1/1990 | Nagai et al. ................ 474/267 |
| 5,378,206 A | | 1/1995 | Mizuno et al. |
| 5,427,728 A | | 6/1995 | Beck et al. |
| 5,429,555 A | * | 7/1995 | Beckh ......................... 474/267 |
| 5,611,745 A | | 3/1997 | Uto et al. |
| 5,616,090 A | * | 4/1997 | McGee et al. .............. 474/267 |
| 5,645,504 A | | 7/1997 | Westhoff |
| 5,653,656 A | | 8/1997 | Thomas et al. |
| 5,802,839 A | | 9/1998 | Van Hook |
| 6,068,916 A | | 5/2000 | Takeuchi |

FOREIGN PATENT DOCUMENTS

| | | |
|---|---|---|
| EP | 0 685 661 | 12/1995 |
| EP | 0 714 757 | 6/1996 |
| EP | 0 699 506 | 3/1999 |
| EP | 0 742 383 | 3/2000 |
| JP | 7-243483 | 9/1995 |
| JP | 9-82346 | 3/1996 |
| WO | WO 98/58794 | 12/1998 |

* cited by examiner

*Primary Examiner*—Marcus Charles
(74) *Attorney, Agent, or Firm*—C. H. Castleman, Esq.; S. G. Austin, Esq.; J. A. Thurnau, Esq.

(57) ABSTRACT

A power transmission belt using an open mesh textile material in the belt overcord which is stabilized with a material promoting permeation of an underlying gum rubber layer through interstices in the textile material during vulcanization of the belt. The coefficient of friction of the backside of the belt is sufficient to enable the belt to drive backside pulleys, tensioners and other mechanical devices.

9 Claims, 4 Drawing Sheets

POWER TRANSMISSION BELT USING STABILIZED OPEN MESH TEXTILE MATERIAL IN OVERCORD FOR ENHANCED RUBBER PENETRATION

CROSS-REFERENCE TO RELATED APPLICATIONS

This application claims the benefit of U.S. Provisional Application Nos. 60/165,381 filed Nov. 12, 1999 and No. 60/206,102 filed May 20, 2000 and No. 60/240,587 filed Oct. 13, 2000.

BACKGROUND OF THE INVENTION

Field of the Invention

This invention relates to power transmission belts of the rubber type, particularly a belt whose back surface possesses favorable frictional characteristics to allow it to make contact with and drive mechanical devices such as idler pulleys, tensioners, engine components such as a water pump, and the like.

Modern front end accessory drive systems for automobiles use serpentine multi-V-ribbed belts to link the engine crankshaft with various accessory driven pulleys. The backside of the belt typically impinges against backside idler pulleys and/or tensioning devices. Similarly, camshaft belt drive systems for automotive application systems use synchronous power transmission belts, the backsides of which are also trained about idler pulleys and/or tensioners. In addition, in many industrial belt drive applications, the drives include idlers or other devices against which the back of a multi-V-ribbed belt, synchronous belt, flat belt, V-belt or the like engages. In all of the foregoing automotive and industrial applications, in order for the backside of the belt to drive the device against which it impinges, the belt must have a minimum dynamic coefficient of friction, otherwise undesirable slippage between the belt and device occurs. For many automotive applications the minimum dynamic coefficient of friction has been set by the manufacturers at about 0.35. Positioning or adhering a textile fabric at the backside surface of the belt, due to the relatively low inherent coefficient of friction of the textile yarns making up the textile material, is inadequate to drive the mechanical devices off the backside of the belt, and does not meet the automotive manufacturers' specification.

The coefficient of friction on the backside of the belt can be increased, on the other hand, by calendaring the overcord textile material, such as tire cord, or a bias-laid fabric of the square woven kind, or in which the warp and weft yarns are oriented diagonally in respect to the longitudinal running direction of the belt, at an included angle between the yarns of about 90–120 degrees (so-called "Flex-Weave®" fabric-trademark of The Gates Corporation). The gum rubber that is applied during the calendaring operation fills the interstices of the fabric as well as presenting an outer layer of rubber on the fabric. This frictioned fabric/gum assembly is normally cut and respliced (using a Banner® table—a trademark of Burrowes Manufacturing Ltd) to provide the correct fabric cord orientation. This fabric cord orientation provides maximum or optimal lateral strength while allowing high flexibility in the longitudinal direction of the belt.

However, if calendared fabrics are used as the overcord fabric of the belt, in addition to inherently poor wear resistance of the outer rubber layer, most manufacturing processes require making overlapping splices to reconnect the material after "Bannering", as well as during the belt building process. These overlap calendared splice joints create double thickness areas which have been found to cause noise and vibration in automotive serpentine drives. As the belt rotates around the drive, these splices contact the backside idlers, tensioners and the like which can cause the belt to emit noise and the belt and drive components to vibrate. Noise and vibration can also be caused as the backside idler, tensioner or other device makes contact with depressions left in the relatively thick rubber layer on the backside of the belt left as a negative impression from a polymeric film transfer label after the film, typically formed of a Mylar film (registered trademark of E. I. du Pont de Nemours) polyester backing, is stripped from the belt sleeve following vulcanization.

The use of knit overcord fabrics in rubber power transmission belts, per se, is known from U.S. Pat. No. 3,981,206 (Miranti et al). The knit fabric employs yarns made of a nylon-spandex biconstituent monofil. The knit fabric is bonded to the tension section of the belt with any suitable adhesive means. The belt construction of Miranti et al is built upright on a cylindrical drum carrying a matrix sleeve by applying various layers of material wrapped therearound, including the outer (nontubular) knit fabric. Such wrapping process will produce a seam or lapped joint.

Seamless knitted tubular fabrics have also been used in the overcord of non-rubber power transmission belts of the liquid cast (polyurethane) type. Unexamined Japanese patent application no. 7-243 483 (Bridgestone), published Sep. 19, 1995, discloses a multi-V-ribbed belt in which the tubular knit in the overcord is positioned directly against the tensile cord prior to liquid casting. The tensile cord and tubular knit make direct contact in the final fabricated liquid cast belt.

It is an object of this invention to overcome drawbacks in the prior art by providing a rubber power transmission belt utilizing a textile-reinforced overcord section which imparts lateral stability to the belt while allowing high flexibility in the running direction of the belt, and is characterized by use of a particular open mesh fabric construction which permits flow through of rubber during processing to achieve a belt back surface having optimum frictional and wear resistance properties.

It is a further object to achieve the foregoing using an overcord construction which is free of significant ridges or steps at the belt exterior surface which would generate unacceptable noise levels or vibration in belt drives using backside idlers, tensioners or other mechanical devices impinging on the backside of the belt.

SUMMARY OF THE INVENTION

These and other objects of the invention are met by a power transmission belt which includes a rubber body, a strain-resisting tensile member embedded in the body, an overcord section terminating in a generally flat exterior belt back surface, and an undercord section. The belt uses an open mesh textile material formed of interlacing yarns defining interstices between the adjacent yarns as the overcord fabric. The yarns are at least partially coated with a stabilizer material. The coated textile material is positioned at the exterior belt back surface and a rubber layer is adhered to the coated textile material on its under-surface, interposed between the coated textile material and the strain-resisting tensile member. The rubber layer is also positioned between the interstices within the open mesh fabric and is positioned at the belt back surface. The open mesh textile material has an openness factor defined by the following formula:

$$0.20 \le \frac{1/x - y}{1/x} \le 0.98 \quad (1)$$

where x=yarn count in ends per mm (or other length of measure), and y=yarn diameter in mm (or other matching, length measurement).

In another aspect, the power transmission belt of the invention may be manufactured by a method including the steps of forming a vulcanizable belt sleeve by: treating the textile material by at least partially coating the yarns with a stabilizer material; applying the treated textile material about the exterior surface of a belt building drum; wrapping a rubber layer serving as an adhesion gum layer over the treated textile material; helically winding strain-resisting tensile cord members about the rubber layer; and applying a further rubber layer over the exterior of the helically would tensile cord. The thus formed vulcanizable belt sleeve is then subjected to heat and pressure to vulcanize the sleeve so that a portion of the adhesion gum layer penetrates the interstices of the textile material and becomes positioned against the building drum to form a portion of the back surface of the belt. The belt sleeve may then be severed in individual belts and profiled to the desired shape.

BRIEF DESCRIPTION OF THE DRAWINGS

Preferred aspects of this invention will be described with reference to the accompanying drawings, in which like numerals designate like parts in the several figures, and wherein.

DESCRIPTION OF PREFERRED EMBODIMENT

Figure 1:
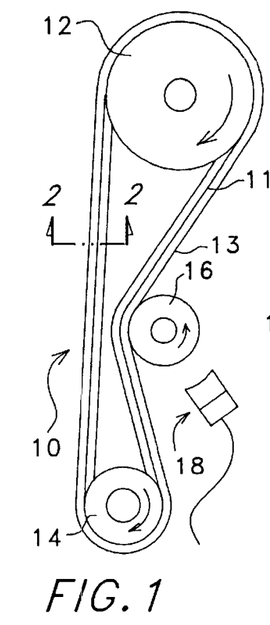
FIG. 1 is a simplified engine accessory drive system.
Figure 2:
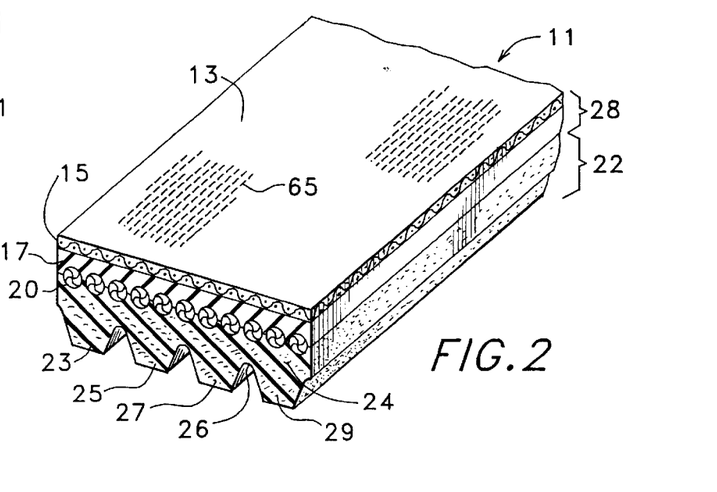
FIG. 2 is a transverse cross section of a multi-V-ribbed belt used in the accessory drive system of FIG. 1 taken along 2—2, rotated to show the belt in perspective.

Referring first to FIGS. 1 and 2 of the drawings, an engine accessory drive system is shown generally at 10, consisting of an engine crankshaft pulley 14, and a driven pulley 12 linked in driving relationship by a four-ribbed serpentine belt 11. The top or exterior back surface of 13 of belt 11 makes contact with idler pulley 16. The drive system 10 of FIG. 1 may be used as a simple automotive accessory drive system, an industrial drive, or a test apparatus for measuring noise generated at the interface between belt 11 and backside idler pulley 16 through sensor/transducer 18 (measuring dB's and noise characteristics). The particular application and type of drive system will be dictated by the type of belt configuration chosen. Generally the principles of the invention may be applied to V-belts, flat belts, multi-V-ribbed belts and synchronous belts. An example of a common automotive front end accessory drive system in which the belt of the invention may be used is illustrated and disclosed in U.S. Pat. No. 4,551,120, which consists of a main driving pulley operatively connected to an air conditioning motor pulley, an alternator pulley, an engine air pump pulley, and a water pump pulley. The multi-V-ribbed belt trained about these pulleys is kept in appropriate tension through a tensioner having a surface engaging the backside of the belt.

The belt of FIG. 2 is formed of a rubber body. By "rubber" is meant a cross-linkable natural or synthetic rubber which is processable in solid form, e.g. on a mixing mill. Such rubber is typically mixed in a green or unvulcanized form with appropriate additives, extenders, reinforcements, accelerators, fillers, vulcanizing agents, e.g. sulfur and peroxides, and the like in a Banbury® mixer (trademark of Farrel Corporation), or continuous mixer, well known in the rubber processing industry. Layers or calendared sheets of stock are then ready to be built up in layered form with textile reinforcement and the like. The green reinforced rubber in sleeve or other form is vulcanized or cured under heat and pressure. If cured in sleeve form, individual belts may be cut from the sleeve. Typical synthetic rubbers useful in the invention include polychloroprene, copolymers of ethylene and propylene, terpolymers of ethylene, propylene and diene monomers, e.g. EPDM, styrene butadiene rubber, HNBR, CSM, silicone rubber, fluoroelastomers, mixtures of the foregoing, and alloys or mixtures of the foregoing or other known solid-processable rubbers mixed with suitable thermoplastic or thermosetting polymers or "plastomers", polyethylene, polyester (Hytrel—registered trademark of du Pont) or materials such as Santoprene plastic—registered trademark of Advanced Elastomer Systems, L.P. Liquid processable elastomeric materials such as those formed by liquid casting, applicable to many forms of polyurethane, are not within this definition and are not contemplated by the invention.

The belt of FIG. 2 is a four-ribbed serpentine belt employing a strain-resisting tensile member 20 which is embedded in the rubber body of the belt. It is positioned by helically winding it as will be discussed further in respect to the building process described with reference to FIGS. 7 and 8. The tensile cord members may be any typical strain-resisting cord or members formed of nylon, polyester, carbon, aramid e.g. Kevlar® fibers—a registered trademark du Pont, or Twaron® fibers—a registered trademark of Teijin-Twaron B. V. and the like, and are typically formed of twisted yarns. The yarns, in turn, are usually composed of many fibers. The cords may be sized or treated e.g. with RFL (resorcinol formaldehyde latex), to enhance adhesion to the rubber. The undercord or compression section 22 of the belt may be formed of an unloaded rubber stock, however typically it is formed of a suitable rubber in which has been mixed loading of discrete reinforcement fibers 24 of desired material such as cotton, polyester or aramid. The multiple ribs of the undercord section shown at 23, 25, 27, 29 may be formed by grinding away the fiber loaded rubber between adjacent ribs, up to the apex 26 between adjacent ribs, or by molding, fly cutting or other technique. The shape and configuration of the ribs is normally substantially matched to the corresponding shape of the pulleys 12 and 14 about which the belt is linked in driving relationship.

The overcord section of the belt shown at 28 includes a generally flat exterior belt back surface 13, an open mesh textile overcord material 15 positioned at the exterior belt back surface, and an interposed rubber layer such as adhesion gum layer 17 which is selected to adhere to the tubular knit textile material 15 as well as the adjoining cords 20. The adhesion gum layer 17 may be formed of the same or similar (compatible) rubber material as utilized in the undercord section 22 to ensure proper adhesion and integration into the composite belt structure.

By "open mesh textile material" as used in this invention is meant a textile material formed of interlacing yarns defined interstices (openings) between adjacent yarns, and which has an openness factor defined by formula (1) above. Preferably the openness factor is between about 0.20 and about 0.98 as provided above, more preferably from about 0.40 to about 0.92, and most preferably from about 0.70 to about 0.90.

The individual yarns may be formed of multiple, continuous filaments, generally with a suitable degree of twist, however typically the yarns are formed of bundles of twisted staple fibers of any suitable material such as cotton, polyester, nylon, aramid, carbon or blends thereof or other spun yarns. Alternatively, the yarns may be comprised of individual elastic core filaments covered with a staple or texturized textile sheath. Yarns formed of monofilaments are not contemplated by this invention, since such monofilaments will generally retain their geometric shape and do not benefit from applying a stabilizing coating thereon, to ensure flow-through of rubber during the process of producing the belt.

The yarns are typically interlaced to form a particular type of fabric, such as a square woven fabric, tire cord fabric, or bias-laid fabric in which the warp and weft yarns are oriented diagonally in respect to the longitudinal running direction of the belt, or the aforementioned Flex-Weave® fabric. Most preferably the open mesh textile material takes the form of a radially stretchable, preferably knit material. Whether the open mesh textile material of the invention is in the form of a woven or knit fabric, or other form, it is important that the textile material is not pre-impregnated with a rubber material, such as by calendaring the textile material in a rubber calendar which fills the interstices of the textile material with rubber and applies a friction layer of rubber on either or both sides of the web of textile material being calendared.

Figure 4:
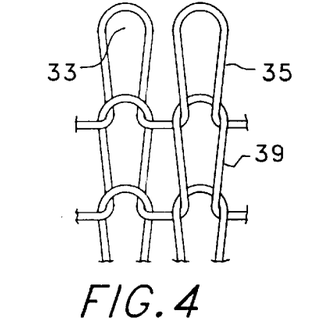
FIG. 4 is a partial plan view of a ribbed knit fabric usable in the overcord section of the belt of the invention.
Figure 9:
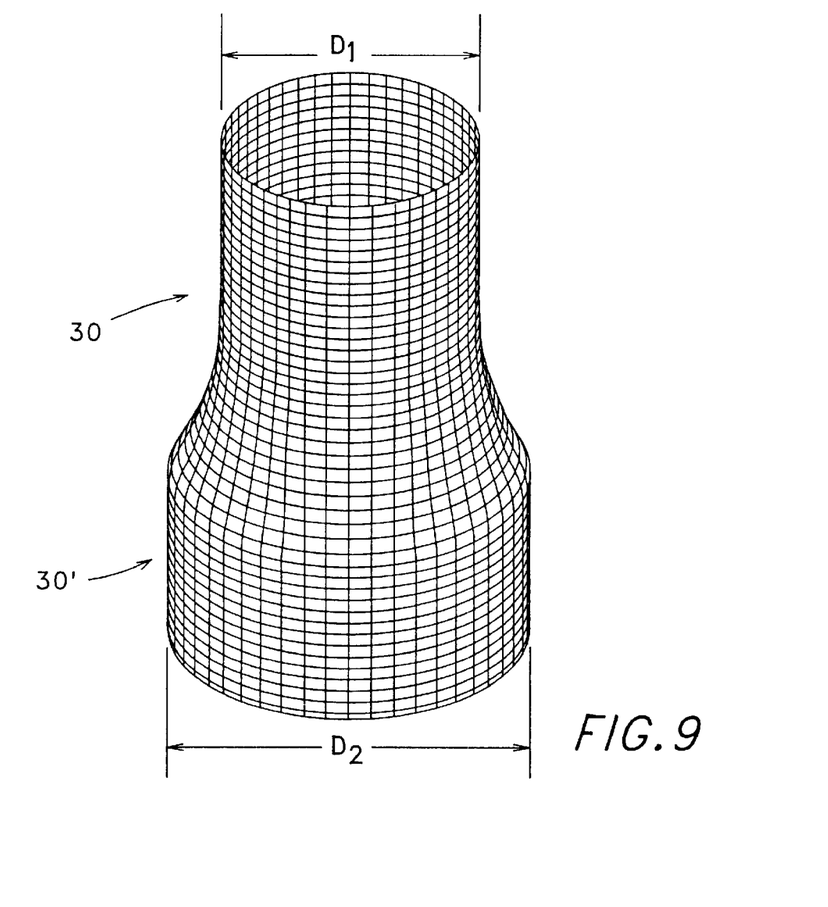
FIG. 9 illustrates a seamless tubular knit textile material used in the invention in both its rest position, as well as partially expanded as shown.

The most preferred form of open mesh textile material is a radially stretchable, preferably knit material 15. It may be in the form of a seamless tube, such as shown at 30 in FIG. 9 of a rest diameter of $D_1$ which, because of inherent stretchability of up to 500% or more typically, may be expanded (at 30') to an increased diameter $D_2$ as shown. The normal diameter $D_1$ should be chosen to be equal to or preferably somewhat less than the diameter of the building drum or mandrel, with the rest diameter $D_1$ of the tubular knit textile material being preferably from about 20 to 100 and more preferably from about 30 to about 80 percent of the final diameter of the knit tube as applied in stretched condition on the building drum. In general, the degree of expansion, and the corresponding opening size of interstices 33, 34 (FIGS. 4 and 5) of the tubular knit material, and its construction (e.g. denier, fiber type and twist, and density of courses and wales) can be selected to obtain a resultant belt surface, given the flow-through of adhesion gum layer 17 through the interstices, with a coefficient of friction selected for optimal belt performance for the application.

Figure 5:
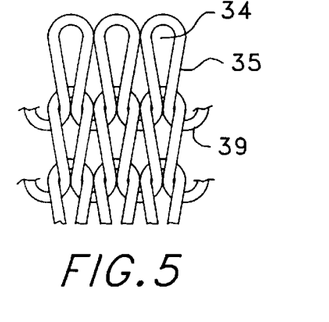
FIG. 5 is a plan view of the technical face of a jersey knit construction usable in the belt of the invention.

Knit tube 30 (FIG. 9) is produced in a seamless tube form, i.e. the circular knitting process inherently produces a tube of a particular diameter $D_1$ depending on the preselected equipment components utilized in the knitting machine. It is contemplated that tubes 30 of a given diameter may be useful for more than one belt size given the significant stretchability of the knit tube itself. Different knit patterns may be employed, such as the rib-knit configuration shown in FIG. 4 in which the wales or vertical rows 35 of stitches of yarns 39 intermesh alternately on the face and the back of the knit. Rib-knit fabrics of this type have good elasticity, especially in the width direction. A jersey knit as shown in FIG. 5, formed of a circular knit fabric made with a plain stitch is currently the most preferred knit fabric for use with the invention. Although not essential, it is preferred that the technical face, as shown in FIG. 5, faces inwardly (toward the adhesion gum layer 17). As with the rib-knit of FIG. 4, the wales or rows extend vertically in the figures, as well as vertically in the tube of FIG. 9. Such orientation, when applied to the belts of FIG. 2 and FIG. 3, for instance, will cause the wales or vertical rows of stitches to be oriented transversely to the longitudinal (running) direction of the completed belt. Other knit or radially stretchable configurations which can be formed into a seamless or seamed (e.g. sewn or spliced) tubular configuration with openings (interstices) allowing rubber flow through are also contemplated.

The invention also contemplates use of an open mesh knit material conveniently supplied from a roll in sheet form, so that it may be applied to the building mandrel with a predetermined stretch/tension control to allow selection of the desired openness and configuration of the weave pattern applied to the mandrel. Such an approach is illustrated in FIG. 6(*b*). Knit strip 37, which may be let off from a roll, can be formed from slitting a knit tube made on a circular knitting machine, or may be a flat knit or weft knit fabric made on a flat knitting machine. As shown in FIG. 6(*b*), a strip or web of knit material 37 is applied to the surface of the drum (for production of a belt of the type shown in FIG. 2) tensioned as desired, and then lapped at joint 39. Because an open mesh material is used in accordance with the invention, it has been found that a lap of typically 3 cm or less, more preferably less than 1.5 cm, because of the openness of the knit reinforcement, will not impede flow-through of the rubber at the overlap joint during vulcanization of the belt during its manufacture.

Figure 6A:
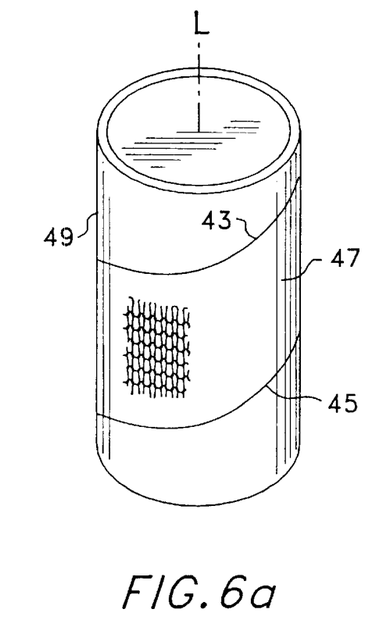
FIG. 6 depicts different options for cutting and applying textile material to a belt building drum.
Figures 6B, 6C:
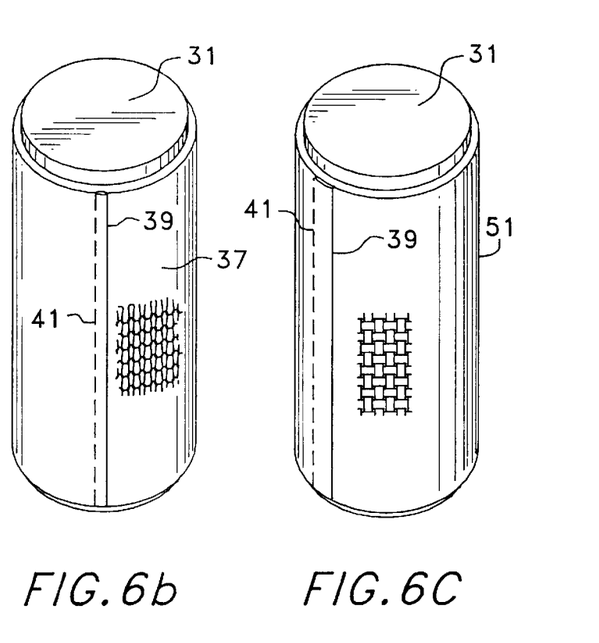

Alternatively, as illustrated in FIG. 6(*a*), the knit material may be formed by spirally cutting a continuous long knit tube (only a segment of which is shown) as shown at 43, 45 at an acute angle, preferably from about 25 to about 65 degrees to the longitudinal axis L of the knit tube. In this manner a continuous strip 47 of knit material cut on a bias relative to the direction of the wales 35 of the knit is produced and this offers benefits by orienting the knit at a bias along the flat exterior belt back surface 13, enhancing the lateral flex properties of the top surface 13 of the belt 11. Once the strip 47 is produced from the continuous tube 49, the strip 47 would be collected on a roll and then payed off, as needed, for treating with the stabilizer material, followed by wrapping onto building drum 31 with an overlap as shown in FIG. 6(*b*) as previously discussed.

In another embodiment, a square woven fabric 51, or a woven fabric with the warp and weft oriented with respect to one another at an included angle between the yarns of about 90–120 degrees ("Flex-Weave®"), may be applied to drum 31 with a seam 39 and overlap 41, similarly in respect to the embodiment shown in FIG. 6(b).

In addition to continuous seamless knit or other radially stretchable tube reinforcements, and lapped knit and woven constructions, the open mesh textile material of the invention may also be applied to the building drum with the ends of the fabric butt spliced together in known fashion, including by ultrasonic welding, sewing or the like.

Figure 10A:
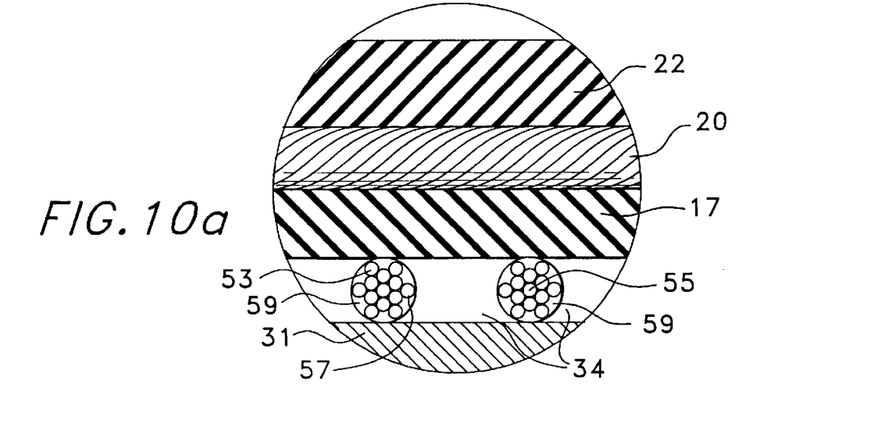
FIG. 10 depicts schematically in close-up views different stages of the building process, and comparing the belt and process of the invention using the yarn stabilizer coating to a belt and process which does not using the yarn stabilizer coating.

It has been found, in accordance with the invention that the degree of flow-through of rubber adhesion layer 17 through interstices in the open mesh textile material during the vulcanization process is surprisingly enhanced to a very substantial degree by pre-coating the individual interlacing yarns of the fabric with a geometry stabilizing coating treatment of a material which effectively penetrates the yarn bundle to bind and rigidify it, and to prevent its collapse or flattening during processing. Reference is first made to FIG. 10(a) which depicts the building of the belt sleeve onto mandrel 31, before vulcanization. On to mandrel 31 is applied an open mesh textile material, as defined above, comprising interlaced yarns 53, 55, themselves formed of a bundle of staple or continuous filament fibers 57, usually twisted together as a spun yarn or multiple filament yarn. These yarns are treated by coating or otherwise to be at least partially covered, and impregnated within their own interstices of the yarn bundle, with the aforementioned stabilizer material 59.

The most preferred stabilizer material currently envisioned is an RFL (resorcinol formaldehyde latex), which offers the benefits of rigidifying the yarn bundle to maintain its substantially round geometric shape during processing, as well as serving as an adhesive to promote bonding with adhesion gum rubber layer 17, and may have sufficient tack to hold together the overlap splice 41 (FIGS. 6(b) and 6(c)) during build, if an overlapped textile material is used. Alternatively, it has been found that isocyanates such as MDI (methylene diisocyanate), and TDI (toluene diisocyanate) are similarly effective. Two component polyurethanes and rubber cements are additional materials which are usable in accordance with the invention as stabilizer materials to maintain the geometry of the yarn, while leaving the interstices 34 of the open mesh textile material open to allow unimpeded flow-through of rubber during vulcanization. As illustrated in FIG. 10(a), the open mesh textile material with individual yarns being at least partially coated with stabilizer material 59 are first applied to the surface of mandrel 31, and then successive layers of adhesion gum rubber 17, spirally wound tensile cord 20 and undercord 22 are built up on the drum.

Figure 10B:
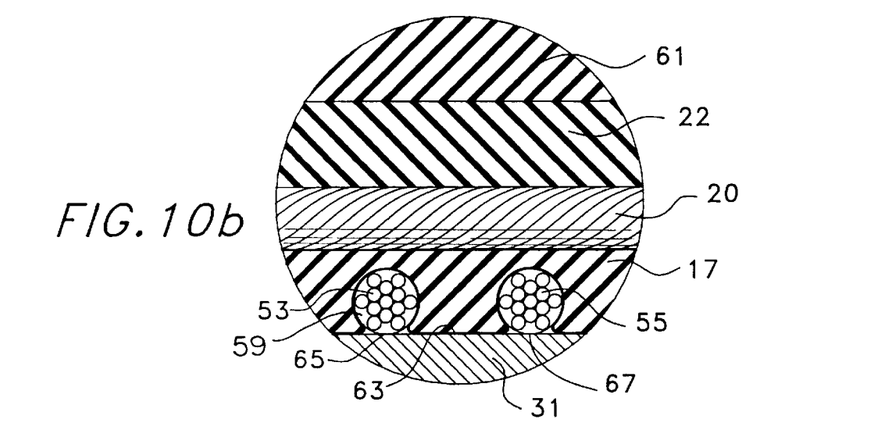

As will be discussed more fully later, the vulcanization process involves the application of heat and pressure to cause the belt component materials to be compressed toward the mandrel, consolidated and the rubber cross-linked through vulcanization under heat and pressure to form a consolidated cured belt sleeve. As schematically illustrated in FIG. 10(b), during the vulcanization process an outer airbag formed of rubber 61 is pressurized radially inwardly toward mold 31 to press the belt elastomer components, which have become softened under the application of heat to move toward mandrel 31 which causes adhesion gum layer 17 to flow into the interstices 34 between adjacent yarns 53, 55, and to be pressed against the surface of the mold 31. During the course of vulcanization, stabilizing material coating 59 substantially maintains the geometric shape of the yarn bundles 53, 55 to maintain the maximum interstitial opening between the yarns 53, 55 and thereby allow maximum flow-through of adhesion gum rubber 17 to surface 63 of mold 31. However, the yarn tips at 65, 67 which are located at the outermost exterior surface at the top of the belt will be preferably free from full encapsulation by the rubber of the rubber body of the belt. That is, such yarn tips 65, 67 and associated staple fibers or filaments will be unencapsulated (but carry the stabilizer coating) to present at the back surface of the belt a desirable wear-resistant fabric surface. At the same time, sufficient rubber material has flowed through interstices 34 to be present at outer surface 63 to increase the coefficient of friction of the back belt surface 13 to a desirable level, typically above about 0.35, more preferably above about 0.45, as needed to drive pulleys, tensioners and other mechanical devices off of the back of the belt.

Figure 10C:
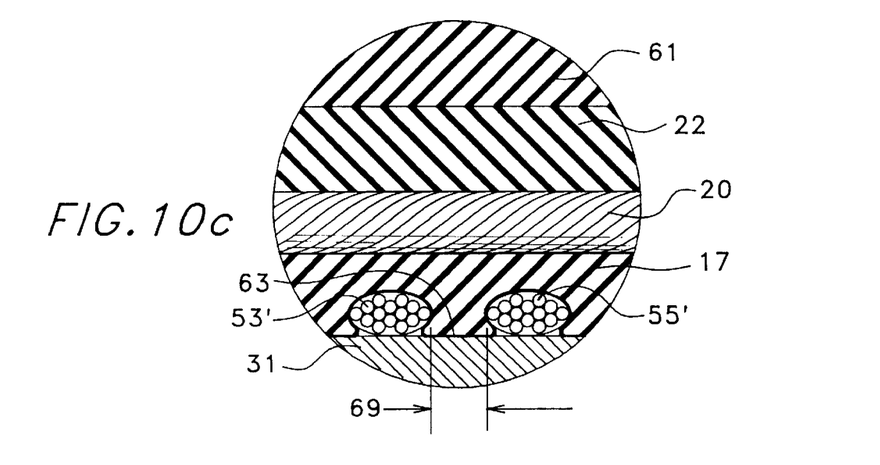

As shown in FIG. 10(c), if yarns bundles 53', 55' are not pretreated with the desired stabilizing material during vulcanization, airbag 61, under vulcanization conditions, causes pressure to be applied to adhesion gum layer 17 which, in turn, flattens yarns 53', 55' more or less in an elliptical or flattened configuration which results in substantial constriction of the interstitial opening 69. This allows less rubber to flow through to the outer belt surface 63. Upon removal from the mold the unstabilized yarn may also tend to recover part of its original non-flattened shape, causing the rubber to appear to be recessed from the belt exterior surface. These factors result in an effective reduction in the coefficient of friction presented by the outer belt surface 13.

Figure 3:
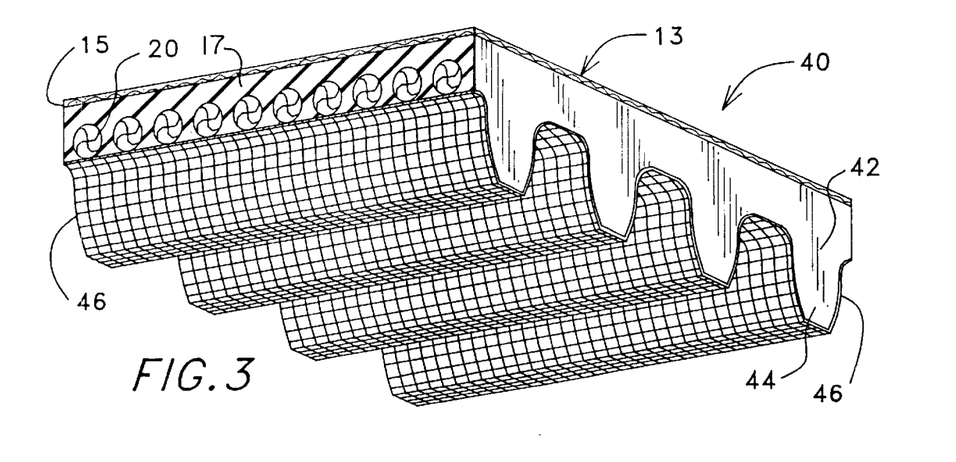
FIG. 3 is a perspective, partial sectional view of a synchronous (timing) belt made in accordance with the belt of the invention.

Although the invention has been illustrated with respect to the V-ribbed belt of FIG. 2, which is built up in inverted form on mandrel 31 so that the open mesh textile material is applied against the building drum, the invention as previously described applies to other types of belts, including the synchronous or timing belt illustrated in FIG. 3.

Referring to FIG. 3, belt 40 is formed of a rubber body 42 in which is embedded a strain-resistant tensile cord 20. A series of cogs or teeth 44 are disposed on the underside of the belt adapted to mesh with corresponding teeth of a sprocket in gear-like fashion to transmit power in synchronization. Belt 40, similarly to multi-V-ribbed belt 11 discussed in respect to FIG. 2, employs an open mesh textile material 15 at the exterior back surface 13 of the belt. A layer 17 of rubber of adhesion gum type is interposed between cord 20 and the exterior belt surface 13, and during processing a portion of the rubber extrudes through the interstices e.g. 33, 34 of a seamless tubular knit textile material 15, but preferably does not fully encapsulate all of the knit material, leaving protruding yarn segments on the exterior surface 13. As with the V-ribbed belt of FIG. 2, the open mesh textile material may alternatively be formed of lapped or spliced knit, tire cord, square or bias-applied woven fabric, or Flex-Weave® fabric. In all cases the textile material is pretreated with the stabilizer material.

The belt teeth 44 may, in customary fashion, carry an outer abrasion resistant tooth fabric layer 46 adhered to the rubber of the teeth. Typical suitable materials include a stretch nylon square woven fabric material or knit material. The teeth 44 may also include transverse stiffening elements or other reinforcements not shown.

Figure 7:
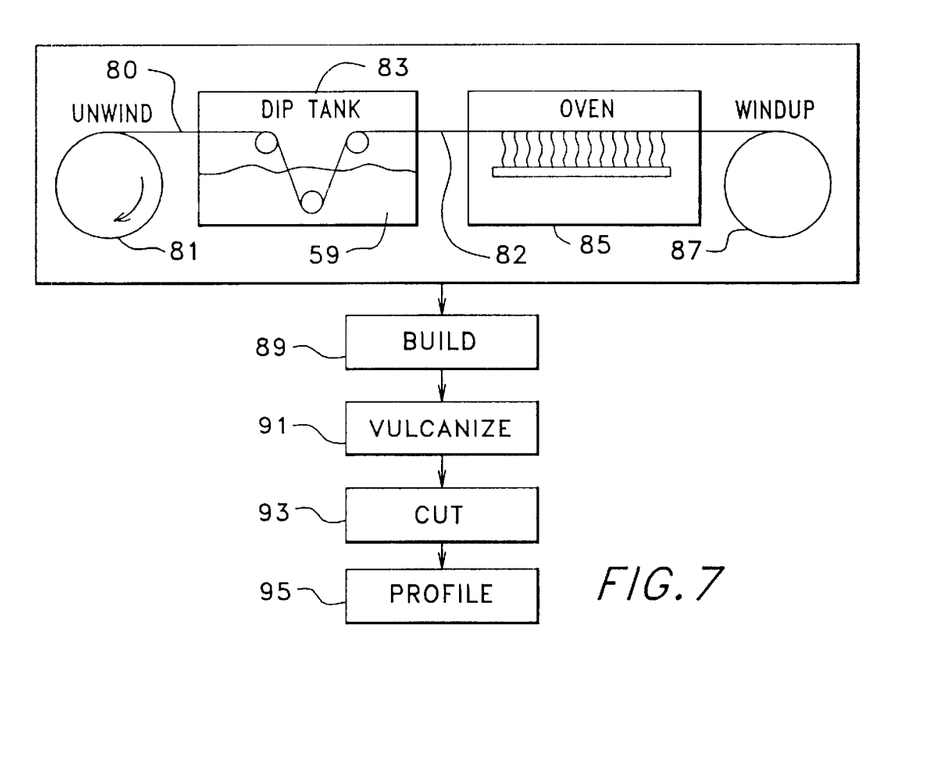
FIG. 7 is a block diagram of a preferred step-wise flow process for producing the belt of FIG. 2.

In general, the method of producing a power transmission belt in accordance with the invention follows the sequential processing steps of FIG. 7 in which a vulcanizable belt sleeve is formed, then vulcanized, and then subject to optional additional cutting or profiling. To form the vulcanizable belt sleeve, the open mesh textile material 80, whether in a web form or as a flattened continuous tube, is played out from roll 81 and passed through dip tank 83 containing stabilizer material 59 e.g. solution of RFL having 10 to about 30 weight percent solids. A set of two rolls may be used to remove excess solution by pressing against each other with controlled pressure at the exit of the dip tank 83. Linear speed of the web, residence time within tank 83, solution weight percent solids, and pressure of the two rolls will determine the amount of pickup of stabilizer material on web 80, adjustable as desired. Other methods for applying the stabilizer coating may be used, such as spraying, brushing or electrostatic coating. The thus treated textile web 82 is then dried in oven 85 or in other suitable fashion and taken up on windup roll 87 and thereafter transferred to the build station 89.

Figure 8:
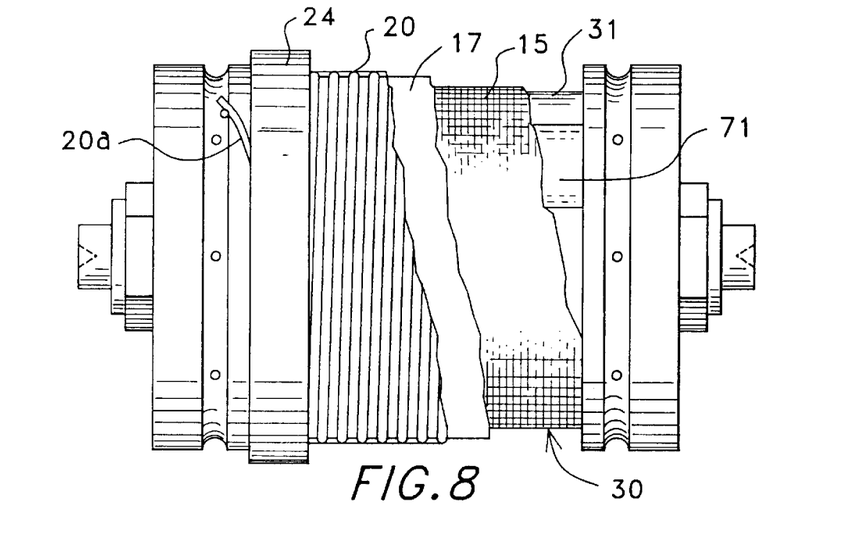
FIG. 8 depicts a partial cut-away of a belt building drum (mandrel) showing the different layered components assembled on the drum to construct a belt sleeve in accordance with the invention.

To build or form the vulcanizable belt sleeve to manufacture the belt of FIG. 2, reference is also made to the build apparatus illustrated in FIG. 8. On to building drum 31 is first applied, optionally, an elongated transfer label 71 upon which is imprinted any desired indicia, e.g. product numbers, trademarks, country of origin, to be imparted to back surface 13 of the belt. This transfer label typically is a relatively thin film of Mylar or other plastic material bearing heat or pressure sensitive ink printing which during vulcanization is transferred from the Mylar backing to the outer surface 13 of the belt. As the belt is built inverted, the next layer applied on the drum is the open mesh textile material 15 of the invention including the seamed, spliced and lapped constructions described in relation to FIG. 6. Preferably, however, the textile material is formed of seamless tube 30 of knit textile material of FIG. 9, which is expanded and elastically stretched sock-like over the mandrel 31 and grips, without wrinkles, against the outer surface of drum 31 with interposed transfer label 71. In this fashion, the wales 35 run longitudinally of the drum, i.e. parallel to its axis. Although it has been found satisfactory to employ a single tubular knit or other open mesh textile material layer 30, obviously depending on the application, two or more layers could advantageously be used, with any intervening rubber layer applied as dictated by the application.

Over the open mesh textile material 15, preferably knit tube 30, is wrapped one or more layers of elastomer such as adhesion gum rubber 17. Preferably the ends of the layer(s) are butt spliced to avoid a lap which might otherwise be reflected as a protrusion or bump in the exterior surface 13 of the belt. This gum layer 17 may alternatively be fiber loaded with any suitable reinforcement fiber such as cotton, polyester or aramid, or may itself include one or more textile reinforcing layers embedded therein. On to gum layer 17 is applied, by helically winding, strain-resisting tensile cord 20 in typical fashion. The tensile cord may be closely or widely spaced, as needed, and an appropriate amount of winding tension is used, with the ends 20a secured, as shown. Lastly, layer 22 which will serve as the undercord of the belt, is wrapped over the helically wound cord 20. This material may be gum stock, or include discrete fiber loading 24 to enhance the modulus of the ribs 23, 25, 27, 29.

Once the sleeve has been built up on drum 31, the assembly may be placed inside a vulcanizing bag and kettle with steam pressure introduced to press the bag radially inwardly against the outer surface of the sleeve (against layer 22), consolidating and vulcanizing (91) the sleeve in customary manner. The mold may then be disassembled and the sleeve demolded. The sleeve may then be cut (93) into individual V-ribbed belts which are then placed on a grinding drum and the profile (95) of ribs 23, 25, 27, 29 formed with complimentary shaped grinding wheels or flycutters, removing undercord material between the ribs, and up to apices 26. Alternatively, the ribbed profile may be formed by molding by using a matrix airbag during vulcanization on drum 31, where the shape of the airbag is impressed into the overcord section 24. Alternatively, an airbag can be placed over the plied up build 24 and the sleeve pressed outwardly during vulcanization against a rigid outer shell member having the conjugate shape of ribs 23, 25, 27, 29 formed in the shell. Various methods of manufacture will be appreciated by those having skill in this art.

Although the foregoing process has been described in relation to the manufacture of a multi-V-ribbed belt, it will also be appreciated by those skilled in the art that the synchronous belt of FIG. 3 can also be formed on an appropriate apparatus similar to FIG. 8. For instance, to form the belt of FIG. 3. the mandrel or drum 31 will typically have longitudinally extending teeth on its surface which form belt teeth 44. In this manner, the belt will be built upright rather than inverted. The radially outermost layer to be applied will be the open mesh textile material 15 in the form of tube 30 or any other desired form and then applied over the partially formed belt sleeve. In that case, an outer airbag will be used to press the rubber/composite materials radially inwardly against the toothed mold mandrel 31.

With similar modifications the belt of FIG. 2 could also be built upright, rather than inverted. In that case the outermost layer is preferably the open mesh textile material.

Whether producing the belt of FIG. 2 or FIG. 3 by using the outer open mesh textile material 15 in accordance with the invention, the standard transfer label 71 may be employed without producing any, or any significant, discontinuities on the outer surface 13 of the belt which would otherwise serve as noise generators when impacting backside idlers or tensioners or other devices. That is, when the open mesh textile material is positioned at the exterior belt surface 13 as shown in FIG. 10(b), with the outermost yarn fibers 65, 67 being free from full encapsulation by the rubber matrix, when the transfer label 71 is pressed against the outer surface 13 during vulcanization, the printed material is transferred to the back of the belt without substantially affecting its flat, generally planer outer surface (the step formed is generally less than about 0.03 mm). This has unexpectedly been found to be the case even after removal of the Mylar printing strip. Thus, there are no significant ridges, discontinuities or steps (which in the prior art belt construction are greater than about 0.04 mm typically) impressed into the outer surface 13. This is in contrast with prior art belts using a calendared (frictioned) Bannered fabric, having an outer thin rubber layer at the exterior surface of the belt. In the case of the prior art belt, when the Mylar transfer label is vulcanized into the outer surface of the belt, it presses against the outer rubber layer, causing it to compress and exude out the edges when the rubber is softened due to heat and pressure. When the Mylar strip is removed from the finished belt significant ridges or depressions are left behind on the exterior belt surface. These ridges 57 create noise when impinging against idler and tensioner pulleys.

EXAMPLE

Two sets of belt sleeves A and B were constructed as follows. For belt sleeve A in accordance with the invention, a tubular cotton jersey knit having a weight of 3.5 oz./yard$^2$ (118.7 gm/m$^2$) was used having a nominal thickness of 0.38 mm, a yarn count of one (1) end/mm, a nominal yarn diameter of 0.2 mm, and each yarn formed of spun staple cotton fibers, having a dtex of 266. The knit material had an openness factor (formula (1)) of 0.8. The knit tube was supplied from a roll and passed through a dip tank by immersion in an RFL adhesive bath, with a solids content of 20 weight percent, excess adhesive removed by squeezing with rubber covered rolls, and dried in an oven at 175° C. for one minute, and wound up on a spool. The RFL was based on a vinyl pyridine SBR latex, with a resorcinol-formaldehyde to latex ratio of 18. The dry amount of RFL deposited on the knit fabric was about 10 percent of the total weight of treated fabric. The belt sleeve was built inverted on a steel mandrel having a diameter of 39.0 cm by plying up the following layers:

| Ply | Material | Thickness |
|---|---|---|
| layer 1 | RFL coated knit | 0.381 mm |
| layer 2 | EPDM gum stock | 2 × 0.305 mm |
| layer 3 | polyester tensile cord | 0.940 mm |
| layer 4 | undercord stock | 5 × 0.762 mm |

The gum stock was Nordel 1145 EPDM (see U.S. Pat. No. 5,610,217). The jersey cotton tube was stretched to a diameter approximately 300 percent of the rest diameter of the coated tube. The tensile cord was RFL treated S and Z twist polyester, and the undercord stock was five plies of fiber load stock (25 parts cotton plus aramid fibers per 100 parts Nordel 1145 EPDM). The total build length (mold outside circumference) was 122.504 cm. The belt sleeve was cured using an outside (kettle) pressure of 200 psig (1.379 MPa) at 389° F. (198° C.) for 3 minutes, an inside (bag) pressure of 50 psig (0.345 MPa) for 3.5 minutes increased to 150 psig (1.034 MPa) for 9.5 minutes. The cure was complete in 19.75 minutes.

Belt sleeve B was constructed for comparison using the same materials and processing conditions as sleeve A except that the yarn of the knit tube was not treated with RFL or any other material.

Belt sleeves A and B were cut into 20.0 mm wide belt strips which were then profiled by using a diamond grinding wheel to form four ribbed belts resembling that depicted in FIG. 2. Belts from sleeves A and B were tested to determine the coefficient of friction of their top surface 13. The test apparatus consisted primarily of a driven pulley of about 15 cm diameter with a flat outer surface against which the backside of the test belts were wrapped through an angle of 35 degrees. In addition, the test belts were trained about a driver pulley of about 15 cm diameter with about 180 degree wrap, a tensioner positioned between the drive and driven pulleys, and a hanging deadweight supplying constant tension on a third pulley over which the test belts are wrapped for about 180 degrees. The test was performed by applying torque to the driven pulley in the counter direction to belt travel to induce slip relative to the driver pulley until 100 percent slip is attained. By using the following formula dynamic coefficient of friction $\mu$ is calculated $$\mu = \frac{1}{\theta} \ln\left[\frac{\frac{2\tau}{d} + T_s}{T_s}\right] \quad (2)$$

where $\theta$ is the wrap angle in radians of the driven pulley $\tau$ is the torque on the driven pulley $T_s$ is belt slack side tension.

Using the aforementioned test apparatus and method, belts from sleeve A had a calculated (formula (2)) dynamic coefficient of friction of 0.52, whereas belts from sleeve B had a calculated (formula (2)) dynamic coefficient of friction of 0.30. Using the same technique with an outer conventional fabric calendared with EPDM gum stock, yielded a calculated dynamic coefficient of friction of 0.83.

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A power transmission belt comprising a rubber body, a strain-resisting tensile member embedded in the body, an overcord section terminating in a generally flat exterior belt back surface, and an undercord section, the improvement comprising an open mesh textile material formed of interlacing yarns defining interstices between adjacent yarns, the yarns being at least partially coated with a stabilizer material, the coated textile material being positioned at the exterior belt back surface and a rubber layer adhered to the coated textile material on its under-surface and interposed between the coated textile material and the strain-resisting tensile member, the rubber layer also being positioned within the interstices and at the belt back surface, and the open mesh textile material has an openness factor defined by the following formula:

$$0.20 \leq \frac{1/x - y}{1/x} \leq 0.98$$

where x=yarn count in ends per mm and y=yarn diameter in mm.

2. The power transmission belt of claim 1 in which the textile material has an openness factor greater than or equal to 0.40, and less than or equal to 0.92.

3. The power transmission belt of claim 1 in which the textile material has an openness factor greater than or equal to 0.70, and less than or equal to 0.90.

4. The power transmission belt of claim 1 wherein the coated yarns positioned at the exterior belt back surface are free from full encapsulation in the rubber body.

5. The power transmission belt of claim 1 wherein the textile material is a seamless tubular knit material formed of yarns, fibers of which positioned at the exterior belt back surface are free from full encapsulation in the rubber body.

6. The power transmission belt of claim 1 wherein the textile material is a circular jersey knit.

7. The power transmission belt of claim 1 wherein the textile material is selected from a lapped knit material, a spliced knit material, a lapped square woven fabric, a spliced square woven fabric, and a tire cord fabric.

8. The power transmission belt of claim 1 wherein the stabilizer material is selected from resorcinol formaldehyde latex (RFL), isocyanate, polyurethane, and rubber cement.

9. The power transmission belt of claim 1 having on said exterior belt back surface a transfer label imprinted thereon, without significant noise-generating steps in such surface.

* * * * *